(12) United States Patent
Berner et al.

(10) Patent No.: US 12,535,340 B2
(45) Date of Patent: Jan. 27, 2026

(54) INDUCTIVE SENSOR FOR DETECTING A POSITION

(71) Applicant: Bourns, Inc., Riverside, CA (US)

(72) Inventors: Sebastian Berner, Munich (DE); Martin Wischke, Holzkirchen (DE); Christian Prölss, Munich (DE); Hasan Coskuner, Rosenheim (DE)

(73) Assignee: Bourns, Inc., Riverside, CA (US)

( * ) Notice: Subject to any disclaimer, the term of this patent is extended or adjusted under 35 U.S.C. 154(b) by 91 days.

(21) Appl. No.: 18/352,207

(22) Filed: Jul. 13, 2023

(65) Prior Publication Data

US 2024/0019276 A1 Jan. 18, 2024

(30) Foreign Application Priority Data

Jul. 15, 2022 (DE) .......................... 102022117762.9

(51) Int. Cl.
*G01D 5/20* (2006.01)

(52) U.S. Cl.
CPC .................. *G01D 5/2073* (2013.01)

(58) Field of Classification Search
CPC .................................................. G01D 5/2073
See application file for complete search history.

(56) References Cited

U.S. PATENT DOCUMENTS

| | | | | |
|---|---|---|---|---|
| 6,483,295 B2* | 11/2002 | Irle | .................. | G01D 5/204 |
| | | | | 324/207.16 |
| 7,652,469 B2* | 1/2010 | Meyer | .................. | G01D 5/202 |
| | | | | 324/207.16 |
| 2021/0080291 A1* | 3/2021 | Ocket | .................. | G01D 5/2073 |
| 2022/0065662 A1* | 3/2022 | Lu | .................. | G01D 5/2086 |
| 2022/0120551 A1* | 4/2022 | Hao | .................. | G01D 5/2086 |

FOREIGN PATENT DOCUMENTS

DE 4429444 A1 3/1995
EP 3865824 A1 8/2021

OTHER PUBLICATIONS

Lugani, L., et al., "High speed inductive position sensor for E-machines," Melexis Technologies SA, 2021, 1-7.

* cited by examiner

*Primary Examiner* — Walter L Lindsay, Jr.
*Assistant Examiner* — Milton Gonzalez
(74) *Attorney, Agent, or Firm* — Michael Best & Friedrich LLP

(57) ABSTRACT

An inductive sensor for detecting a position. In one example, the sensor includes an oscillator circuit which generates an AC voltage signal and couples it into an exciter coil, and a pair of receiving coils including first and second receiving coils which each form a repeating loop structure and whose arrangement forms a receiving geometry. The exciter coil is arranged to induce a signal in each receiving coil based on the coupled AC voltage signal. An evaluation circuit outputs a sensor signal that depends on the position to be detected, based on the signals induced in the receiving coils, and a movable coupling element influences the strength of the inductive couplings between the exciter coil and the receiving coils as a function of the position to be detected. The receiving coils are located in a geometrical position having an intermediate space between them and are electrically connected to each other.

11 Claims, 5 Drawing Sheets

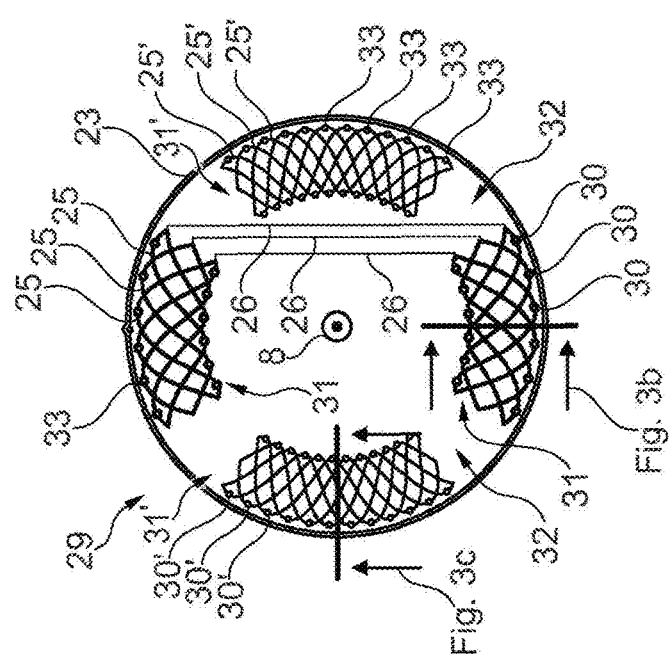
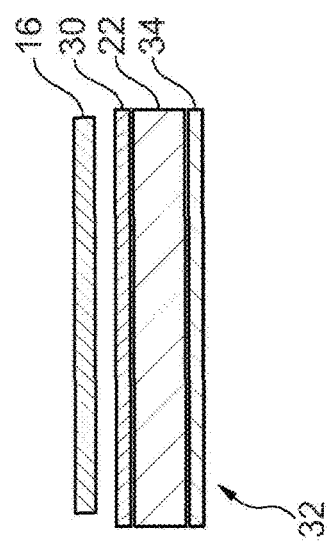
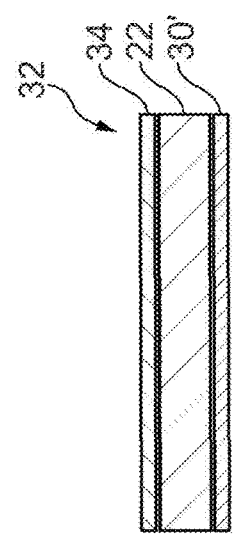

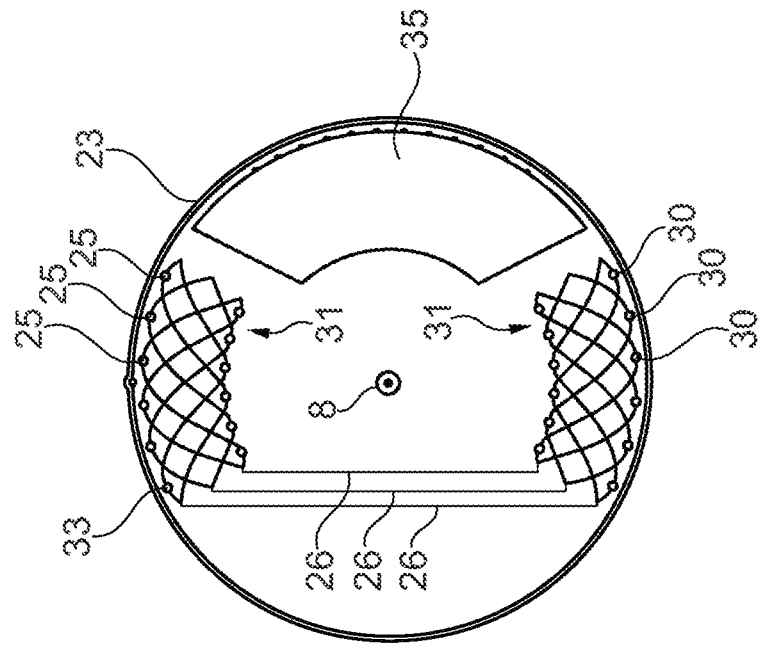
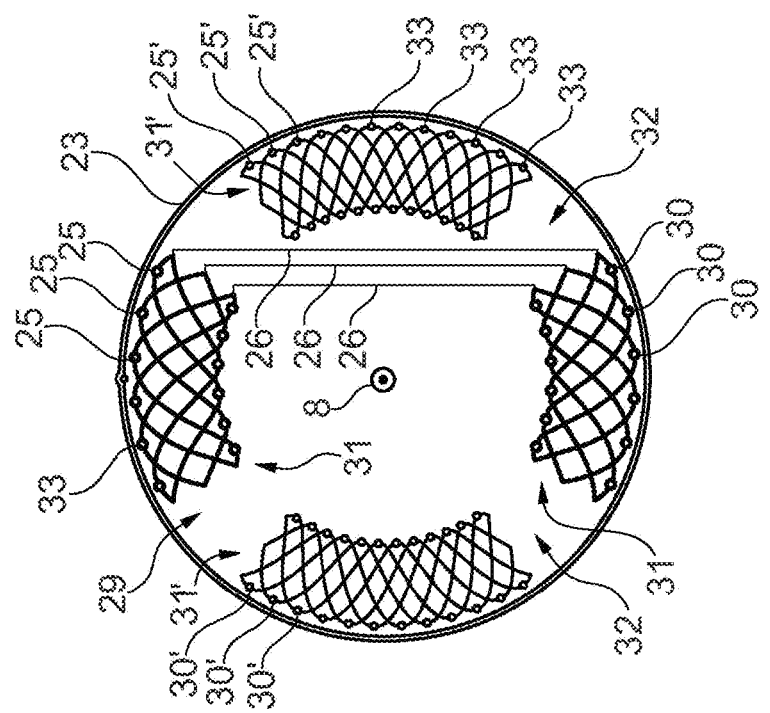

INDUCTIVE SENSOR FOR DETECTING A POSITION

BACKGROUND

The present invention relates to an inductive sensor pursuant to the preamble of the valid claim 1.

SUMMARY

An inductive sensor pursuant to the preamble of the valid claim 1 is known from the publication "High speed inductive position sensor for E-machines, L. Lugani et al, Melexis, 2021" and can be downloaded from https://media.melexis.com/-/media/files/documents/whitepapers/inductive-resolver-e-motors-whitepaper-melexis.pdf.

In order to reduce the error rate of the inductive sensor, the publication suggests on the one hand the use of more than two receiving coils connected in parallel and, in the case of an inductive sensor in the form of an angle sensor, to make the receiving coils in an O-shaped design (closed around the axis of rotation). Although it has already been possible to reduce the error rate with receiving coils in a C-shaped design (i.e. running more than 180° but less than 360° around the axis of rotation), the error rate, however, is always smaller when receiving coils in an O-shaped design are used.

An inductive sensor for detecting a position is known from DE4429444A1 comprising an oscillator circuit which generates a periodic alternating voltage signal and couples it into an exciter coil. Two receiving coils connected in series in the sensor form a common periodically repeating loop structure and thus a common receiving geometry. Based on the coupled AC signal, the exciter coil induces a common signal in the receiving coils, which is evaluated by an evaluation circuit and converted into a sensor signal dependent on the position to be detected. In this process, a movable coupling element influences the strength of the inductive couplings between the exciter coil and the receiving coils as a function of the position to be detected.

It is the object of the invention to improve the inductive sensor.

The task is fulfilled by the characteristics of the independent claims. Preferred embodiments are the subject matter of the dependent claims.

According to one aspect of the invention, an inductive sensor for detecting a position comprises an oscillator circuit which generates a periodic AC voltage signal and couples it into an exciter coil, a pair of receiving coils comprising a first receiving coil and a second receiving coil which each form a periodically repeating loop structure and whose arrangement as a whole forms a receiving geometry, the exciter coil being arranged to induce a signal in each receiving coil based on the coupled AC voltage signal, an evaluation circuit for outputting a sensor signal which is dependent on the position to be detected, based on the signals induced in the receiving coils, and a movable coupling element which influences the strength of the inductive couplings between the exciter coil and the receiving coils as a function of the position to be detected. According to the invention, the receiving coils of the receiving coil pair are arranged in a geometrical position having a space between them and being electrically connected to each other.

The invention is based on the consideration that the inductive sensor mentioned at the beginning is robust against incorrect positioning of its individual parts against each other, however involves very high manufacturing costs. Due to the number of phases, at least six printed circuit board levels are required for a receiving coil laid in an O-shaped design around the axis of rotation for a so-called twisted pair-like wiring, in which a change of PCB level always takes place at the maxima of the loop structures of the receiving coils. The number of required PCB levels can be reduced in the case of a C-shaped design of the receiving coils, but this is accompanied by an increase in the error rate, which is mentioned at the beginning, and a suboptimal design in terms of production technology, because the receiving coil must always be laid with an angle of rotation of greater than 180° around the axis of rotation.

The invention takes a different approach here. The receiving coils of the receiving coil pair, which are connected in parallel and thus electrically connected to each other, eliminate the abovementioned errors in the state of the art stated at the beginning and thus reduce the error rate of the inductive sensor. At the same time, it is possible to effectively reduce the number of PCB levels required to implement the loop structures. Surprisingly, this concept—unlike the idea in the state of the art mentioned at the beginning—can also be applied to an inductive sensor for detecting a linear position if, for example, two receiving coils are electrically connected to each other whose loop structures run parallel to each other. These receiving coils also mutually eliminate errors.

Compared to the inductive sensor mentioned at the beginning with receiving coils connected in series, the mentioned sensor offers an increased sensitivity. When receiving coils are connected in parallel, their total area increases, resulting in higher sensitivity of the sensor. This is advantageous when the signal to be detected is very weak. In addition, the receiving coils connected in parallel provide improved interference immunity, because connecting coils in parallel helps minimize the influence of external electromagnetic interference. This is achieved by directing the induced noise in the coils in opposite directions, causing them to cancel each other out. Finally, the two receiving coils connected in parallel also have a lower total resistance, because in a parallel circuit the total resistance is less than the lowest resistance of the individual coils. This means that the signal can flow through the coils with less resistance, resulting in a higher signal strength.

In an embodiment of the specified inductive sensor, the loop structures of the receiving coils are arranged symmetrical to each other with respect to a center of symmetry. In this way, the error-eliminating effect can be increased.

If the position of the inductive sensor to be detected is an angular position about an axis of rotation, the center of symmetry in an additional further development of the specified sensor can be the axis of rotation, with respect to which the loop structures are formed point-symmetrically. In this way, the error rate mentioned at the beginning can be reduced with significantly simpler means in terms of production technology.

In a particular embodiment, the specified inductive sensor comprises a further pair of receiving coils connected in particular in parallel with a first receiving coil and a second receiving coil, which each form a periodically repeating loop structure and the arrangement of which together forms a receiving geometry, the exciter coil being set up to induce a signal in each receiving coil of the further receiving coil pair on the basis of the coupled AC voltage signal.

With the additional receiving coil pair, the range of functionality of the specified inductive sensor can be extended.

Thus, in a particular embodiment of the specified inductive sensor, the [same] movable coupling element can influence the strength of the inductive couplings between the exciter coil and the receiving coils of the further receiving coil pair as a function of the position to be detected, wherein the evaluation circuit is arranged to output the sensor signal depending on the position based on a comparison of the signals induced in the receiving coils of the receiving coil pair and the signals induced in the receiving coils of the further receiving coil pair. In this way, the specified inductive sensor can be equipped with redundancy in a simple way to plausibilize the detected position.

In a particular embodiment of the specified inductive sensor, a further movable coupling element can influence the strength of the inductive couplings between the exciter coil and the receiving coils of the further receiving coil pair as a function of the position to be detected, the evaluation circuit being set up to output the sensor signal which is dependent on the position based on the signals induced in the receiving coils of the receiving coil pair and the signals induced in the receiving coils of the further receiving coil pair. In this way, a differential position between the two coupling elements can be detected, which can be used, for example, to determine a moment of force or torque.

The two aforementioned concepts can of course also be combined.

In an additional embodiment of the specified inductive sensor, the first receiving coil of the further receiving coil pair is arranged in the intermediate space between the receiving coils of the receiving coil pair as viewed in a direction of change of the position to be detected. In this way, the specified inductive sensor can be realized in an extremely space-saving manner.

In a further embodiment of the specified inductive sensor, the receiving coil pairs are arranged on different sides of a printed circuit board, so that the aforementioned differential position can be detected in a very small assembly space due to the use of only one printed circuit board.

In a further embodiment, the specified inductive sensor comprises an electronic component arranged in the intermediate space, resulting in an even less assembly space requirement for the specified inductive sensor.

In still another embodiment of the specified inductive sensor, the electronic component is an electromagnetic shielding element, which avoids crosstalk between the two pairs of receiving coils, particularly in the detection of the differential position mentioned above.

BRIEF DESCRIPTION OF THE DRAWINGS

The above-described properties, features and advantages of this invention, as well as the manner in which they are achieved, will become clearer in connection with the following description of the embodiments, which are explained in more detail in connection with the drawing, in which:

FIG. 3*a* is a schematic view of a part of the inductive sensor of FIG. 2, FIG. 3*b* is a schematic sectional view of a part of an embodiment of the inductive sensor of FIG. 2 according to a first sectional view shown in FIG. 3*a*, FIG. 3*c* is a schematic sectional view of a part of the embodiment of the inductive sensor of FIG. 3*b* according to a second sectional view shown in FIG. 3*a*, FIG. 4*a* is a schematic view of the part of the inductive sensor of FIG. 2 as shown in FIG. 3*a*, FIG. 4*b* is a schematic view of a part of an alternative inductive sensor.

DETAILED DESCRIPTION

In the figures, the same technical elements are provided with the same reference signs, and are only described once. The figures are purely schematic and, in particular, do not reflect the actual geometric proportions.

Figure 1:
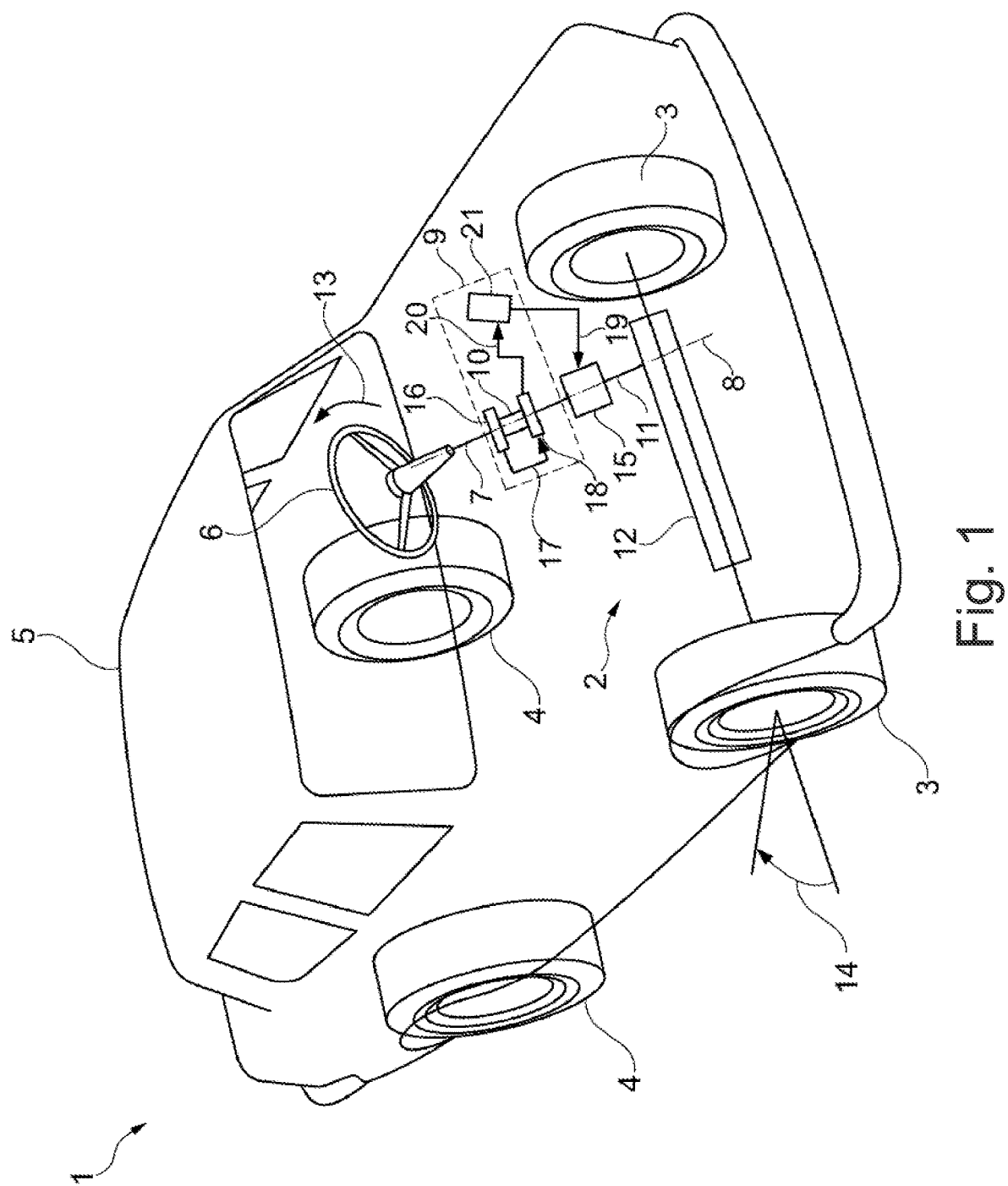
FIG. 1 is a schematic perspective view of a vehicle with a steering system.

Reference is made to FIG. 1, which is a schematic perspective view of a vehicle 1 comprising a steering system 2.

In the present embodiment example, the vehicle 1 comprises a chassis 5 supported by two front wheels 3 and two rear wheels 4. The front wheels 3 can be turned by the steering system 2 so that the vehicle 1 can be driven in a curve.

The steering system 2 comprises a steering wheel 6 which is mounted on a first steering shaft 7 which in turn is mounted pivotally around a rotation axis 8. The first steering shaft 7 is guided into an inductive sensor 9 for detecting a position, here in the form of an angular position, and is connected there to a torsion element 10 in a way that is not specified further. A second steering shaft 11 is connected to said torsion element 10 on the side opposite the first steering shaft 7 on the rotation axis 8, which in turn ends in a steering gear 12. If the steering wheel 6 is turned with a torque in the form of a steering torque 13, the steering torque 13 is transferred accordingly via the steering shafts 7, 11 to the steering gear 12, which, in response, steers the front wheels 3 to drive in a curve with a wheel angle 14.

The steering process is supported by an auxiliary motor 15 which assists the second steering shaft 11 in turning. For this purpose, the steering torque 13 is derived from the relative angular position between the first steering shaft 7 and the second steering shaft 11, which is detected by the inductive sensor 9. The auxiliary motor 15 then steers the second steering shaft 11 inter alia according to the detected steering torque 13.

To detect the abovementioned angular position and thus the steering torque 13, the inductive sensor 9 comprises a coupling element 16 which is connected to the first steering shaft 7, and which influences a magnetic field 17. The inductive sensor 9 further comprises a measuring circuit 18 connected to the second steering shaft 11, which excites the magnetic field 17 and detects it again influenced by the coupling element 16 depending on a relative angular position of the first steering shaft 7 to the second steering shaft 11. The measuring circuit 18 generates a measuring signal 20 dependent on the influenced magnetic field 17 and forwards it to an evaluation device 21. Since the measurement signal 20 includes the angular position to be detected as information, the evaluation device 21 determines the relative angular position of the two steering shafts 7, 11 to each other based on the measurement signal 20 and outputs a sensor signal 19 dependent on this, which is thus also dependent on the steering torque 13 due to the elasticity of the torsion element 10. The sensor signal 19 is thus directly dependent on the steering torque 13 to be detected, so that the auxiliary motor 15 can process this information directly to turn the second steering shaft 11.

The basic function of the inductive sensor 9 is shown in EP 3 865 824 A1. The design of the inductive sensor 9 on which the explanation of the present embodiment is based is described in detail below with reference to FIG. 2.

The inductive sensor comprises a printed circuit board 22 on which an exciter coil 23, an integrated circuit 24 with the evaluation device 21 and with an oscillator circuit not to be seen further, as well as the measuring circuit 18 with a plurality of receiving coils 25 in the form of flat coils are arranged.

Each of the receiving coils 25 forms a periodically repeating loop structure. In the present embodiment, the loop structures have a sinusoidal or cosinusoidal course, are arranged in the shape of a circular segment around the axis of rotation 8 and are offset by 180° relative to each other. The loop structure of each receiving coil 25 forms a receiving geometry in itself, which is described in detail in the previously mentioned EP 3 865 824 A1.

The coupling element 16 is arranged axially above the measuring circuit 18 so as to be rotatable about the axis of rotation 8 and covers a part of the receiving coils 25 of the measuring circuit 18 in the circumferential direction. The covered part of the receiving coils 25 can be changed by rotating the coupling element 16 around the axis of rotation 8.

In the simplest case, the printed circuit board 22 is connected firmly to one of the two steering shafts 7, 11 and is thus placed between the torsion element 10 and these steering shafts 7, 11.

In this case, the oscillator circuit in the evaluation circuit 24 energizes the exciter coil 23 with a periodic signal via a supply line 28. Components, such as a filter capacitor 29, can optionally be arranged in the supply line 28.

As described in detail in EP 3 865 824 A1, the exciter coil 23 energized in this way excites a current in the receiving coils 25 which depends in each receiving coil 25 on the position of the movable coupling element 16. In this respect, the signal of a single receiving coil 25 could be used as the measuring signal 20 for generating the sensor signal 19. However, to reduce the influence of interference fields, the measurement signal 20 and thus the sensor signal is derived from a comparison of the signals of the two receiving coils 25 which are offset by 180° relative to each other.

Figure 2:
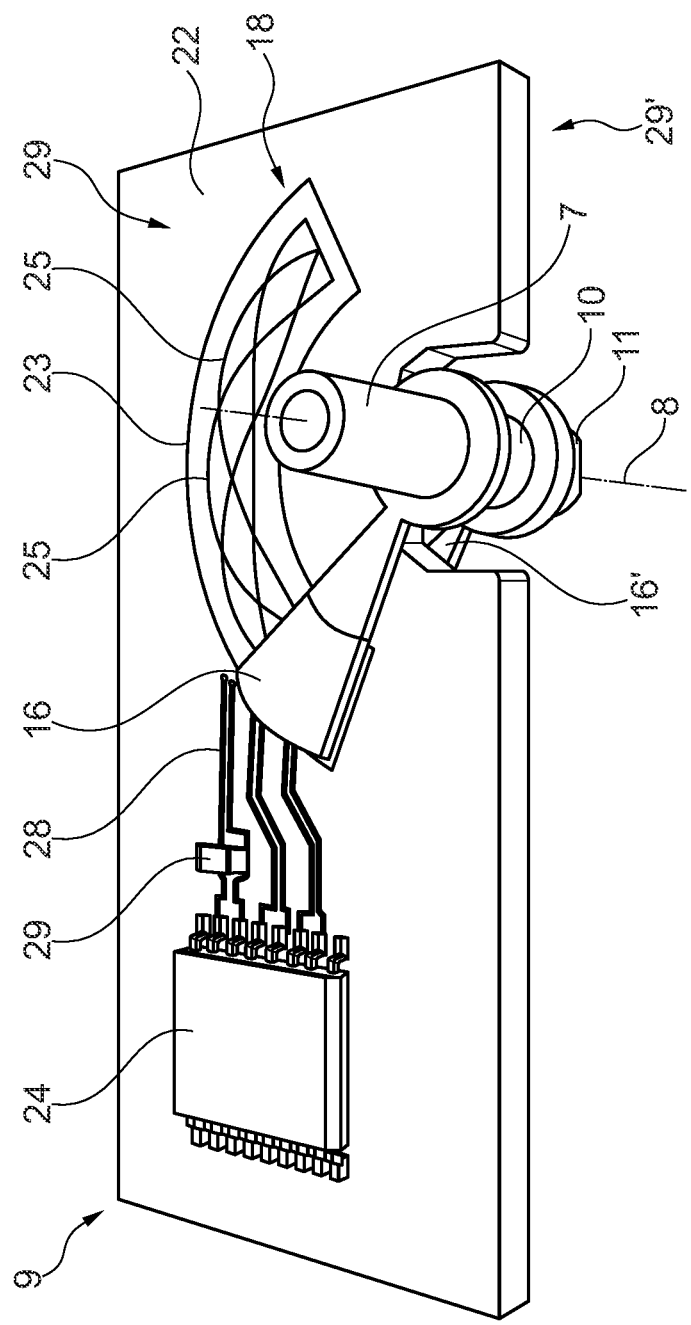
FIG. 2 is a schematic view of a version of an inductive sensor for detecting a position in an application as a torque sensor for the steering system from FIG. 1.

Since fixing the printed circuit board 22 to one of the two steering shafts 7, 11 involves considerable assembly work, the inductive sensor 9 does not determine the measurement signal 20 directly. Rather, the previously described assembly is arranged on both sides of the printed circuit board 22, with only the coupling element being visible of the further assembly in FIG. 2. The elements of the further assembly necessary for detecting the relative angular position are consistently apostrophized in the description below in order to be able to separate the two assemblies. The further coupling element visible in FIG. 2 is therefore provided with the reference signs 16'.

If both steering shafts 7, 11 are arranged movably relative to the printed circuit board 22, the position of the further movable coupling element 16' and thus the position of the second steering shaft 11 is determined in the same way with the design of the sensor 9 on the underside of the printed circuit board in order to determine the above-mentioned relative angular position of the two steering shafts 7, 11 to one another and thus the measurement signal 20 dependent thereon, so that the evaluation device 21 includes the position of the two steering shafts 7, 11 relative to the printed circuit board 22. A comparison of these two positions then produces the measurement signal 20 from which the sensor signal 19 can be derived.

The part of the inductive sensor 9 on the upper side of the printed circuit board 22 is provided with the reference sign 29 for the further embodiments, while according to the definition established above, the part of the sensor 9 on the underside of the printed circuit board 22 is provided with the reference sign 29'.

With reference to FIGS. 3a to 3c, a further embodiment of the sensor 9 is described. For this purpose, only those elements are shown in FIGS. 3a to 3c which relate to the further embodiment. All other elements of the sensor 9 remain unchanged.

FIG. 3a shows the part 29 of the inductive sensor 9 on the upper side of the printed circuit board 22. A first change is that there are now no longer two receiving coils 25 shifted by 180° but three receiving coils 25 shifted by 120° relative to each other. In this way, the position of the coupling element 16 can be detected more precisely.

Three further receiving coils are arranged point-symmetrically to the axis of rotation 8, shifted by 120° to each other, which for the sake of separation are provided with the reference sign 30. The receiving coils with the reference sign 25 are hereinafter referred to as first receiving coils 25, while the receiving coils with reference sign 30 are referred to as second receiving coils 30. Together, the first and second receiving coils 25, 30 form a receiving coil group 31, which in the simplest case mentioned above is a receiving coil pair, when only a single receiving coil 25, 30 is used for detection. If the receiving coil group 31 is larger, a first receiving coil 25 and a second receiving coil 30 always form a receiving coil pair.

In the receiving coil pairs, the respective first receiving coil 25 and the respective second receiving coil 30 are electrically in contact with each other via a connection line 26. This means that the respective first receiving coil 25 and the respective second receiving coil 30 in each receiving coil pair are connected in parallel. This electrical connection line 26 is drawn with a direct connection for each receiving coil pair in FIG. 3a. However, this can only be understood schematically because the steering shafts 7, 11 and the torsion element 10 are located at the position shown.

The connection lines 26 run through an intermediate space 32, which is present between the pairs of receiving coils. However, this intermediate space 32 can also be used for other purposes, which is indicated in FIG. 3 a by a further receiving coil group 31' shown in dashed lines. This further receiving coil group 31 can be used as for executing the assembly 29' on the underside of the printed circuit board 22, which will be discussed in more detail later.

In the receiving coil group 31, it is imperative that the individual receiving coils 25, 30 are electrically separated from each other. For this reason, the receive coils 25, 30 are guided on several levels of the printed circuit board 22 and must therefore be guided back and forth between the individual levels with vias 33. These vias 33 are shown in FIG. 3a in the form of small dots and, for the sake of clarity, are not all provided with a reference sign. In principle, the vias 33 can be selected as desired, as for example described in EP 3 865 824 A1. In the present embodiment, however, the vias are located at the extremes of the sinusoidal and cosinusoidal loop structures of the receiving coils 25, 30. In this way, the receiving coils 25, 30 can be twisted in the plane as in the case of a round cable, which reduces the necessary vias 33 to a minimum.

In FIG. 3a, the previously mentioned further receiving coil group 31' is arranged in the previously mentioned intermediate space 32, which is present on both sides of the receiving coils 25, 30 in the circumferential direction of the axis of rotation 8. However, this further receiving coil group 31' is arranged on the printed circuit board 22 on a side opposite to the receiving coil group 31.

The further receiving coil group 31' has the same features as the previously explained receiving coil group 31, i.e. it has three first receiving coils 25' shifted by 120° relative to each other and three second receiving coils 30' shifted by 120° relative to each other, which are each arranged point-symmetrically relative to the axis of rotation 8. In addition, the receiving coils 25', 30' of the further receiving coil group 31' are divided into pairs of receiving coils electrically connected to each other. However, their electrical connections are not shown in FIG. 3a for the sake of clarity.

The only difference between the two receiving coil groups 31, 31' is a periodicity of the loop structures of the respective receiving coils 25, 30, 25', 30'. Since the receiving coils 25, 30, 25', 30' are driven by an oscillator circuit, unintentional crosstalk between the resulting receiving coil groups 31, 31' can thus be avoided via different resonance frequencies.

To further avoid unintended crosstalk between the resulting receive coil groups 31, 31', shielding elements 34 can be arranged in the above-mentioned intermediate spaces 32, which are formed in principle on both sides of the printed circuit board 22. This is illustrated in FIGS. 3b and 3c, which show sectional views whose viewing direction is indicated in FIG. 3a.

Alternative uses of the intermediate spaces 32 are shown in FIGS. 4a and 4b.

In FIG. 4a, the intermediate spaces 32 are occupied by the further receiving coil group 31' mentioned above, which is indicated by a drawing of the receiving coils 25', 30' in solid lines. In this way, redundancy is introduced into the inductive sensor 9, with which the measurement signal 20 can be made plausible.

Alternatively or additionally, an electrical circuit 35 can also be accommodated in the intermediate spaces 32, which thus no longer has to take up assembly space elsewhere.

Figure 5:
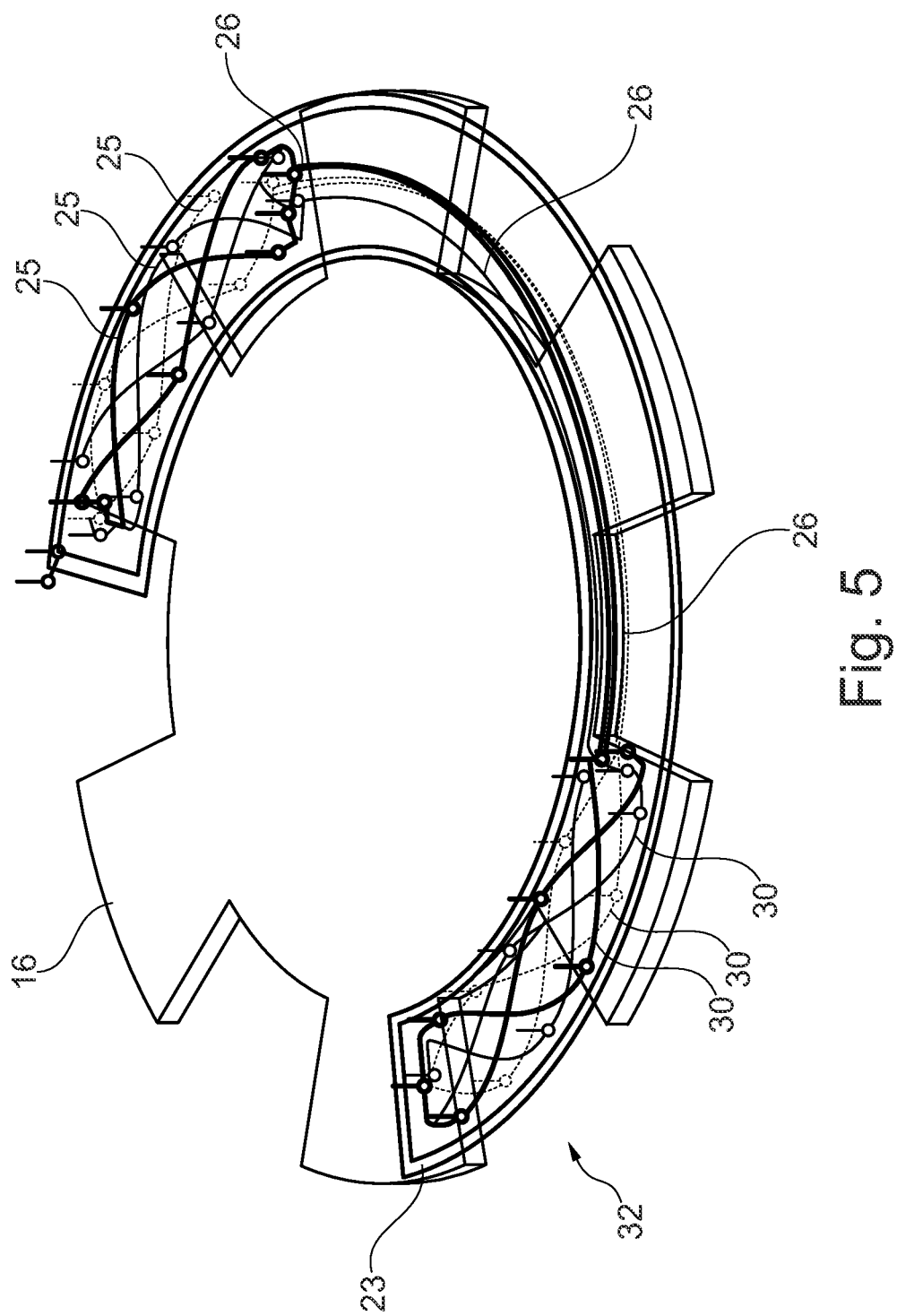
FIG. 5 is a perspective view of a structure of a receiving coil group.

Finally, the structure of the receiving coil group 31 is shown once again in a perspective view in FIG. 5.

What is claimed is:

1. An inductive sensor (9) for detecting a position, the inductive sensor (9) comprising:
   an oscillator circuit which generates a periodic AC voltage signal and couples it into an exciter coil (23),
   a pair of receiving coils (31) comprising a first receiving coil (25) and a second receiving coil (30) disposed separately from the first receiving coil (25), which each separately form a respective periodically repeating loop structure and whose arrangement as a whole forms a receiving geometry, the exciter coil (23) being arranged to induce a signal in each receiving coil (25, 30) based on the coupled AC voltage signal,
   an evaluation circuit (21) for outputting a sensor signal (19) that depends on the position to be detected, based on the signals induced in the receiving coils (25, 30), and
   a movable coupling element (16) which influences the strength of the inductive couplings between the exciter coil (23) and the receiving coils (25, 30) as a function of the position to be detected,
   wherein
   the receiving coils (25, 30) of the receiving coil pair (31) being located in a geometrical position having an intermediate space (32) between them and being electrically connected in parallel to each other.

2. The inductive sensor (9) according to claim 1, wherein the loop structures of the receiving coils (25, 30) are arranged symmetrically to each other with respect to a center of symmetry (8).

3. The inductive sensor (9) according to claim 2, wherein the position to be detected is an angular position about an axis of rotation (8) and the center of symmetry is the axis of rotation (8), with respect to which the loop structures are arranged point-symmetrically.

4. The inductive sensor (9) as claimed in claim 1, further comprising:
   a further receiving coil pair (31') having a first receiving coil (25') and a second receiving coil (30'), which each form a periodically repeating loop structure and whose arrangement as a whole forms a receiving geometry, the exciter coil (23) or a further exciter coil being arranged to induce a signal in each receiving coil (25', 30') of the further receiving coil pair (31') on the basis of the coupled-in AC voltage signal.

5. The inductive sensor (9) according to claim 4, wherein the movable coupling element (16) influences the strength of the inductive couplings between the exciter coil (23) or the further exciter coil and the receiving coils (25', 30') of the further receiving coil pair (31') as a function of the position to be detected, and the evaluation circuit is arranged to output the sensor signal (19) depending on the position based on a comparison of the signals induced in the receiving coils (25, 30) of the receiving coil pair (31) and the signals induced in the receiving coils (25', 30') of the further receiving coil pair (31').

6. The inductive sensor (9) according to claim 4, further comprising a further movable coupling element (16') which influences the strength of the inductive couplings between the exciter coil (23) or the further exciter coil and the receiving coils (25', 30') of the further receiving coil pair (31') as a function of the position to be detected, the evaluation circuit (21) being set up to output the sensor signal (19) which is dependent on the position, based on the signals induced in the receiving coils (25, 30) of the receiving coil pair (31) and the signals induced in the receiving coils (25', 30') of the further receiving coil pair (31').

7. The inductive sensor (9) according to claim 4, wherein the first receiving coil (25') of the further receiving coil pair (31') is arranged in the intermediate space (32) between the receiving coils (25, 30) of the receiving coil pair (31) as viewed in a changing direction of the position to be detected.

8. The inductive sensor (9) according to claim 4, wherein the receiving coil pairs (31, 31') are arranged on different sides of a printed circuit board (22).

9. The inductive sensor (9) according to claim 1, further comprising an electronic component (34, 35) arranged in the intermediate space (32).

10. The inductive sensor (9) according to claim 9, wherein the electronic component (34, 35) is an electromagnetic shielding element (35).

11. The inductive sensor (9) according to claim 1, wherein the receiving coils (25, 30) of the receiving coil pair (31) are located on opposite sides of the intermediate space (32).

* * * * *